July 30, 1946. D. H. HEYNAU 2,404,907
DRIVING MECHANISM
Filed Oct. 12, 1942 3 Sheets-Sheet 1

July 30, 1946.  D. H. HEYNAU  2,404,907
DRIVING MECHANISM
Filed Oct. 12, 1942  3 Sheets-Sheet 2
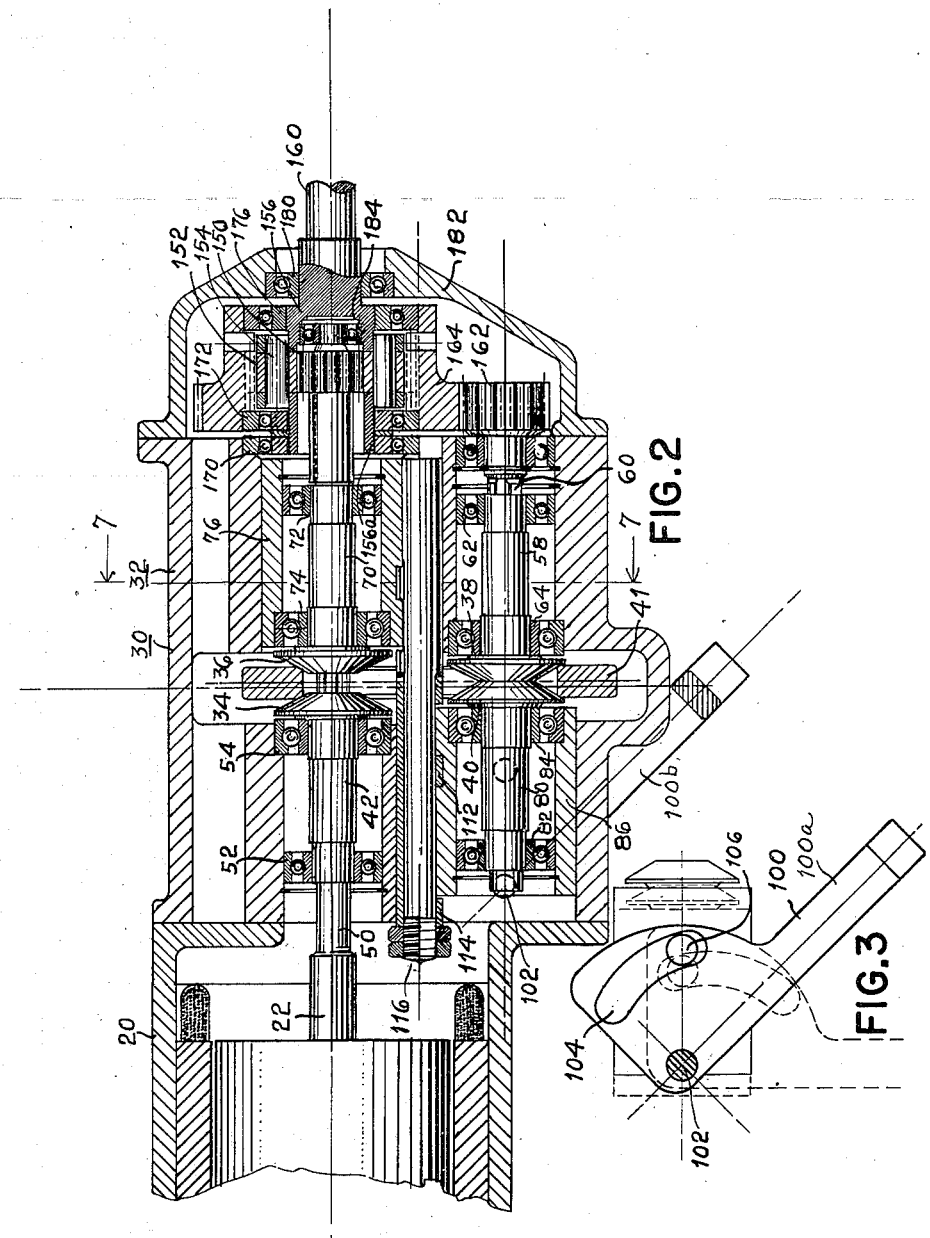

July 30, 1946.  D. H. HEYNAU  2,404,907

DRIVING MECHANISM

Filed Oct. 12, 1942  3 Sheets-Sheet 3

Inventor
David Hans Heynau
By Henry G. Dybvig
His Attorney

Patented July 30, 1946

2,404,907

UNITED STATES PATENT OFFICE 2,404,907

DRIVING MECHANISM

David Hans Heynau, Yellow Springs, Ohio

Application October 12, 1942, Serial No. 461,683

6 Claims. (Cl. 74—284)

This invention relates to a power transmission unit for transmitting power from the prime mover to a load and more particularly to a variable speed power transmission unit.

An object of this invention is to provide a power transmission unit wherein the speed of rotation may be varied and reversed at the will of the operator without shifting gears.

Another object of this invention is to provide a control mechanism for controlling a variable speed and reversing mechanism easily and efficiently at the will of the operator.

Another object of this invention is to provide a multiple power transmission unit transmitting power from a common prime mover to several loads, either independently or simultaneously at various speeds, the speed of one unit differing from the speed of another unit.

Another object of this invention is to provide a control unit for controlling the movement of a gun at the will of the gunner, which gun is power driven.

Another object of this invention is to provide a pair of power transmission units responsive to a common prime mover, one of which units may be used in elevating the gun and the other in rotating the gun horizontally.

Another object of this invention is to combine a power transmission unit utilizing a planetary gear system wherein the relative speed of the gears may be changed in either direction, to thereby control the output speed and direction of rotation.

Another object of this invention is to provide a variable speed and reversing unit driven by a uni-direction constant speed prime mover.

Another object of this invention is to provide a manual control for a variable speed and reversing mechanism wherein equal increments of movement at the control are translated into unequal increments of movement at the variable speed reversing mechanism.

Another object of this invention is to provide a control for a variable speed reversing mechanism such that predetermined increments of movement of the manual controls at low speeds result in a slight change in speed ratio and the same increments at high speeds greatly change the speed of the device.

Other objects and advantages reside in the construction of parts, the combination thereof and mode of operation, as will become more apparent from the following description.

In the drawings:

Figure 1 discloses a schematic cross sectional view of the preferred embodiment of the speed control mechanism used in supplying power for actuating a gun.

Figure 2 is a longitudinal cross sectional view of the variable speed control mechanism, taken substantially on the line 2—2 of Figure 7.

Figure 3 is a fragmentary perspective view of the lever, the bushing controlled thereby and the conical member removed from the housing.

Figure 1:
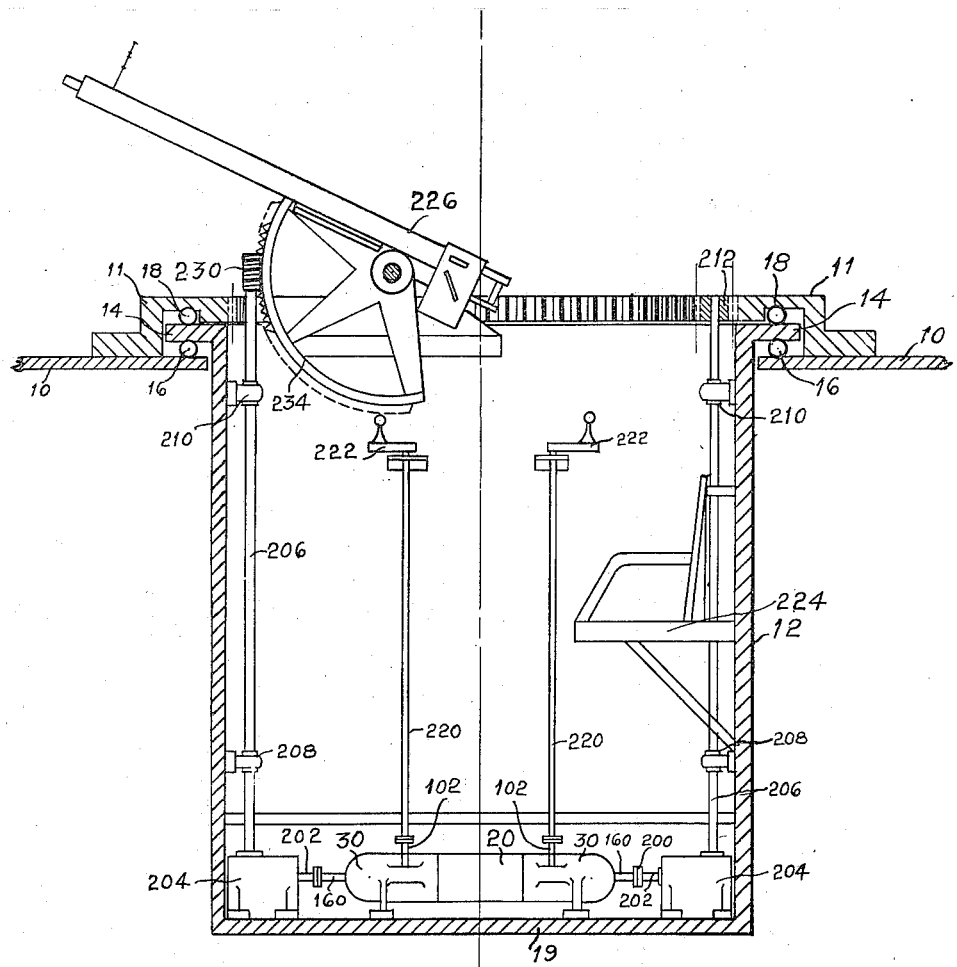

The control mechanism for the gun includes a cage that is rotatably mounted with the gun, which cage supports the driving mechanism, the necessary controls and the gun, as will appear more fully from the description of the device that will now be made.

Referring to the drawings, the reference character 10 indicates a wall of a fuselage, wing or some other portion of an airplane provided with an annular opening. Superimposed upon and attached to the margin of the wall 10 is an annular, internally toothed gear ring 11. The gear ring 11 and the inner margin of the wall 10 cooperate to form an annular channel opening inwardly. A cage 12 is carried in the opening in the wall 10. This cage 12 is provided with an annular outwardly directed flange 14, projecting into the channel formed between the inner margin of the wall 10 and the internally toothed gear ring 11. The flange 14 is mounted upon suitable roller bearings 16 and 18 disposed upon opposite sides of the flange and engaging the wall 10 and the gear ring 11 respectively. Although member 11 has been referred to as a gear ring, a gear sector or gear sectors could be used for some types of installations.

A prime mover 20, such as an electric motor, is mounted in one end 19 of the cage 12, which end may be referred to as the bottom of the cage, as viewed in Figure 1. The cage need not necessarily be arranged so that the lower end shown in Figure 1 is always at the bottom, as the gun in some installations may be mounted below the cage, in which event this end would then be the top of the cage, or the gun may be mounted so that this particular end could be referred to as the vertical end of the cage. In other words, the cage is mounted opposite the gun, irrespective of the particular location of the gun.

This prime mover 20 may consist of an electric motor energized from a suitable voltage source. If, for example, the available voltage is 12 volts direct current, then the prime mover would be a 12 volt D. C. electric motor. This prime mover may be set to rotate at a constant speed in one direction and the same direction at all times when in use.

A pair of reversible, variable speed transmission units 30 are mounted on either side of the prime mover or electric motor 20, one on each end. As these reversible, variable speed transmission units are identical, only one will be described in detail.

As may best be seen by referring to Figure 2, the reversible variable speed transmission unit 30 includes a housing 32. This housing encloses a plurality of conical members 34, 36, 38 and 40 arranged in pairs rotatably connected through a rigid, metallic ring 41. The conical members 34 and 36 constitute the driving unit for the ring driving the conical members 38 and 40.

The relative speed of the two pairs of conical members is dependent upon their adjustment. The conical members 34 and 38 are mounted for rotation without axial adjustment. The other conical member of each pair, namely 36 and 40, are mounted for axial adjustment, as will appear more fully from the detailed description that follows.

Conical member 34 is integral with a tubular sleeve 42 splined to a shaft 50 that is either integral with or connected to the rotor shaft 22. The tubular sleeve 42 is journalled in a bearing 52 and the end-thrust bearing 54, the end-thrust bearing having the inner race arranged to abut the conical member 34, so as to prevent axial movement thereof. The conical member 38 is also provided with a tubular sleeve 58 mounted on a splined shaft 60. The tubular sleeve 58 is journalled in a bearing 62 and an end-thrust bearing 64, the inner race of which abuts the top of member 38. The bearings 52, 54, 62 and 64 are press-fitted or otherwise secured in position in the cavities found in the housing 32. The end-thrust bearings 54 and 64 abut suitable shoulders that provide solid mountings for these bearings.

In order to provide adjustment for the conical members 36 and 40, each of these members is mounted for axial adjustment. The conical member 36 is integral with a tubular sleeve 70 splined upon the shaft 50 and journalled in bearings 72 and 74, of which the latter is an end-thrust bearing. The bearings 72 and 74 are not fixedly secured to cavities in the housing 32; but instead, are mounted in an adjustable bushing 76 mounted for axial movement parallel to the longitudinal axis of the shaft 50. The conical member 40 is integral with the tubular sleeve 80, splined upon the shaft 60, and journalled in bearing 82 and 84, of which the latter is an end-thrust bearing. The bearings 82 and 84 are fixedly mounted in a tubular bushing 86 mounted for axial movement in the housing 32.

In order to change the relative speed of the pairs of conical members, the bushings 76 and 86 are adjusted axially in unison. Thus, it is possible to increase the distance between conical members 34 and 36 and at the same time adjust conical members 38 and 40 toward each other. If members 34 and 36 are adjusted toward each other, members 38 and 40 should then be separated. By changing the adjustment of the conical members, the speed of the metallic ring 41 is changed. Thus, by rotating the conical members 34 and 36 at a constant speed, it is possible to rotate the conical members 38 and 40 at a higher or a lower speed, depending entirely upon the adjustment of the conical members. The mechanism for adjusting the conical members will now be described.

An adjusting lever 100 is mounted on a shaft 102, which shaft is pivotally mounted to the housing 32. This lever is bifurcated and provided with a pair of arcuate slots 104, one in each bifurcation 100a and 100b. The centers of curvature of the slots 104 are displaced from the axis of the shafts 102, so that as the lever 100 is oscillated, a pair of pins 106, actuated by the slots 104, have a longitudinal movement parallel to the axis of the shaft 60. Each pin 106 has one end fixedly attached in the bushing 86, there being one pin 106 mounted on each side of the bushing, so that as the lever 100 is oscillated about the pivot 102, the bushing 86 moves to the right or to the left, as viewed in Figure 2. Since there are two diametrically disposed pins 106, it reduces twisting movements. The angular position and the shape of the arcuate slot is determined by the speed changing requirements. For aircraft guns it is preferable that a predetermined increment of movement of the slots causes a slight change of speed at low speeds and a like increment of movement causes a great change in speed in the higher speed ranges. This permits the rapid shifting of the gun until it is directed near the target, when it may be adjusted slowly to keep it directed on the target.

Figures 4, 5:
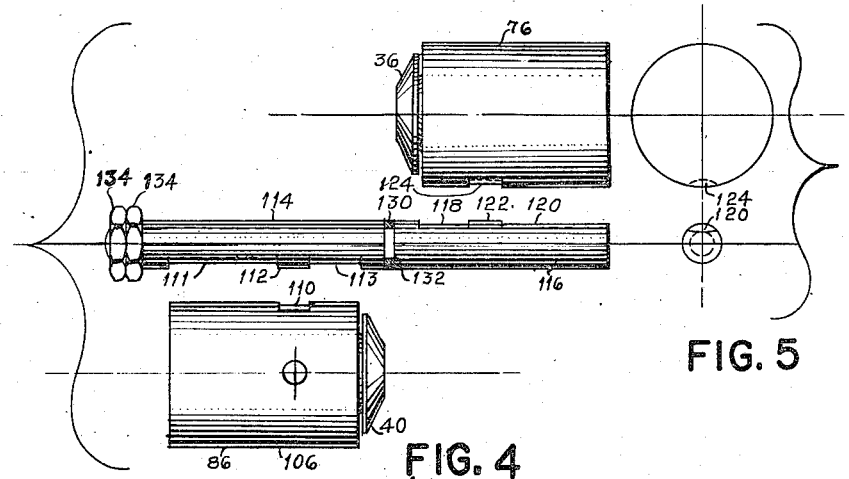
Figure 4 is an exploded view of the bushing control mechanism.
Figure 5 is a diagrammatic end view of one bushing and its control mechanism to show the nature of the cavities therein.

In order to cause bushing 76 to be adjusted in unison with the bushing 86, these two bushings are interconnected by a connecting rod which will now be described. Bushing member 86 is provided with a cut-away portion or notch 110 receiving a projection 112 located between notches 111 and 113 and integral with a tubular sleeve 114 mounted upon a reduced end of a pin 116, provided with an enlarged end having cut-away portions 118 and 120, leaving an extension 122. The extension 122 projects into a suitable notch 124 in bushing member 76. The cut-away portions or notches 110, 111, 113, 118, 120 and 124 are provided with arcuate bottoms that have a curvature corresponding to the complementary part of the adjacent member. The radii of notches 110 and 124 are concentric with the longitudinal axis of the pin 116 and substantially concentric with the axis of rotation of the ring 41. The curvatures of notches 111 and 113 are centered on the axis of rotation of conical member 40. The curvatures of notches 118 and 120 are centered on the axis of rotation of the conical member 36. For the purpose of illustration, the bottoms of some of the cut-away portions have been indicated schematically in Figure 5. This arrangement causes the bushings 76 and 86 to be moved in unison. Due to the fact that the conical members 36 and 40 are diagonally disposed, or located upon opposite sides of the ring 41, it can be readily seen that as these conical members are adjusted to the right or to the left, as viewed in Figure 2, one will be moved away from and the other toward the other conical member of the pair, or vice versa. This causes the ring 41 to be seated between the conical members and contacting the conical members, irrespective of the relative adjustment of the conical members.

A suitable compressible washer or spacing member 130 is located between the shoulder 132 on the pin 116 and the tubular sleeve 114. Instead of a compressible washer being used, a rigid washer of suitable size either with or without shims as required, may be used. In order to tighten or loosen the pressure exerted by the conical members against the bevelled inner periphery of the driving ring 41, it is merely necessary to adjust the lock nuts 134, threadedly engaging the end of the pin 116. The use of the tubular sleeve 114 in addition to permitting adjustment, also facilitates assembly of the parts.

The connecting unit has been centrally positioned in the plane formed by the axis of rotation of the shaft 50 and the axis of the shaft 60. By mounting the connecting unit in this central position, the bearings may be easily adjusted. This connecting unit, consisting of the tubular sleeve 114 and a pin 116, is actuated by the movement of one bushing in a direction parallel to the movement of this bushing and parallel to the movement of the other bushing. This tends to reduce torque and twisting movement. Furthermore, the central location of the connecting unit is a direct method of interconnecting the bushing and the adjustable conical members, thereby obtaining a direct, rigid connection between the bushings. It can readily be seen that a symmetrical arrangement of parts is thereby obtained to great advantage.

The shaft 50 has splined on its outer end a sun gear 150 meshing with a planetary pinion 152 journalled on a pintle 154 carried on a spider 156 that has fixedly attached thereto a drive shaft 160. The outer end of the shaft 60 has splined thereto a gear 162 meshing with the external gear teeth 166 of a ring gear 164, having its internal gear teeth meshing with the pinion 152.

When the velocity imparted by the sun gear 150 to the planetary pinion 152 is equalled and opposite in direction to the velocity imparted by the ring gear 164, the axis of the planetary pinion 152 journalled on the spider 156 stands still. This causes the spider and the output shaft 160 to stand still. This condition exists at a predetermined relative speed ratio of the shafts 50 and 60. This speed ratio will be referred to as the critical speed ratio. Whenever this speed ratio is reduced, the spider 156 will rotate in one direction and whenever the speed ratio is increased, the spider will rotate in the opposite direction. The gear ratios may be so selected that the critical speed ratio of the speed of the shafts 50 and 60 occurs when the conical members of both pairs are equally spaced so that by separating the driving conical members, the spider rotates in one direction and vice versa. This permits the reversal of the speed changing unit. By selecting the proper gear ratios, the critical speed ratio may be one or unity. If so, the spider will stand still whenever the shafts 50 and 60 rotate at the same speed. In the event the shaft 60 rotates at a faster speed than the shaft 50, the spider will rotate in one direction and when the shaft 60 rotates slower than the shaft 50, the direction of rotation of the spider will be reversed. This one to one ratio of the shafts 50 and 60 has merely been selected for the purpose of explanation, as it is not necessary for the operation of the reversible, variable speed unit to select a critical speed ratio of one.

Figure 6:
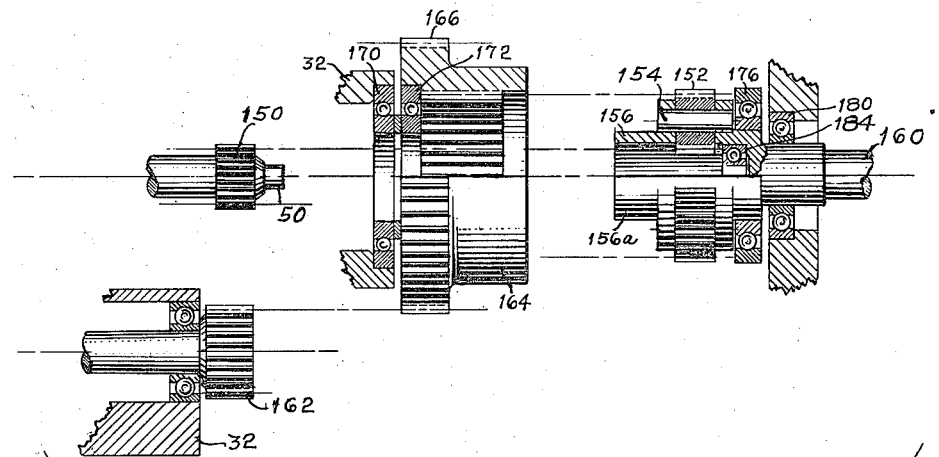
Figure 6 is an exploded view of the differential mechanism.
Figure 7:
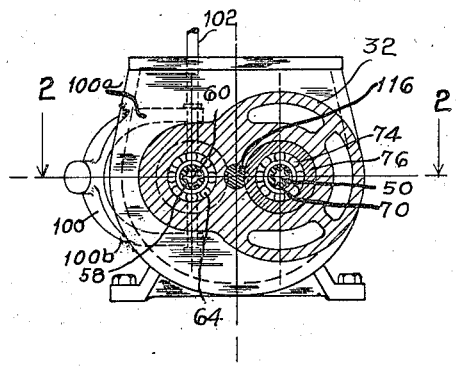
Figure 7 is a cross sectional view of the variable speed control mechanism, taken substantially on the line 7—7 of Figure 2.

As may best be seen by referring to Figure 6, the spider 156 is provided with a plurality of openings receiving the pinions 152. The end 156a of the spider is journalled in a pair of bearings 170 and 172. The bearing 170 is fixedly mounted in the housing 32. The bearing 172 is mounted in the ring gear 164. The opposite end of the spider 156 is journalled in a pair of bearings 176 and 180. The bearing 176 is mounted in the ring gear 164 and the bearing 180 is mounted in the housing 182 enclosing the differential mechanism. A bearing 184 is mounted within the spider 156 and supports the outer end of the shaft 50.

The output shaft 160 of the reversible, variable speed unit mounted to the right of the prime mover is fixedly attached to the spider 156 and is connected through a suitable coupling unit 200 to a drive shaft 202 projecting into a speed reduction gear box 204, provided with a drive shaft 206 suitably journalled at 208 and 210 to the side wall of the cage 12, and carries a gear 212 meshing with the inwardly directed gear teeth on member 11. The control lever 100 is driven through a shaft 220 attached to one of the shafts 102, which control lever is provided with a crank or lever 222 actuated by the gunner seated in a seat 224. It is merely necessary for the gunner to actuate the lever 222 to the right or to the left to rotate the gun 226 mounted on top of the cage 12, as viewed in Figure 1, either in a clockwise or a counterclockwise direction, depending entirely upon the movement of the control lever 222.

The reversible variable speed unit 30 mounted to the left of the prime mover, as viewed in Figure 1, has the output shaft 160 rotating a drive shaft 202 projecting into a speed reduction gear box 204, identical to the one already described. The output shaft 206 of this second unit has its upper end terminating in a worm gear 230, meshing with a worm gear sector 234, raising and lowering the gun in response to movement of the lever 222 shown to the left of Figure 1. Thus, it is seen that the angular position both horizontally and vertically may be adjusted from the same prime mover rotating at a constant speed, without changing gears, but merely changing the relative speeds of two rotating shafts.

The device disclosed herein has merely been shown for the purpose of illustration. The arrangement of parts may be altered and the mechanism changed so as to carry out the same fundamental principles. Instead of utilizing a mechanical control device, such a control device may be hydraulic or possibly electrical.

The device is easily controlled. Instead of utilizing separate control levers, a single control lever or pair of control levers moving in unison may be used, for example, such that the horizontal movement rotates the gun horizontally and the vertical movement raises or lowers the gun, as viewed in Figure 1. As a matter of fact, these movements may be so arranged that the handles point in the direction of the target. Both units may operate simultaneously, causing the barrel of the gun to swing through a diagonal path, depending upon the relative speed of the two units. By this arrangement, it is possible to keep the gun aimed at the target, irrespective of the relative movement of the target with respect to the gun. When the target is passing rapidly within the range of the gun, the gun may be moved rapidly. When the target is moving more slowly, the movement of the gun may be reduced. In the event a target unexpectedly enters the range of the gun, but the gun is directed in some other direction, the gunner may rapidly swing the gun at a high speed into position to be aimed at the newly discovered target.

Due to the fact that in aircraft warfare the target may be within the range of the gun for a period equal to a fraction of a minute, it can readily be appreciated that it is very important that the driving mechanism be adapted to rapidly swing the gun into position, but at the same time to permit slow movement of the gun to keep it on the target. It is possible to do so by the driving mechanism shown herein.

In the embodiment shown herein the prime mover and the reversible variable speed units have been mounted upon the end wall of the cage. The prime mover and the reversible variable speed units may be mounted elsewhere within the cage, or for that matter, on the outside of the cage, whichever may prove the most advantageous for the particular gun mounting and available parts and space. Furthermore, the prime mover and the reversible variable speed units may be mounted outside of the cage, so that one reversible variable speed unit will actuate an external gear on the cage for horizontal movement, as viewed in Figure 1, and the other reversible variable speed unit may drive a shaft extending up through the center of the cage, so as to actuate the elevation of the gun. The controls could then be brought up through the center of the cage by suitable links and connecting units, so that the operator could control the units independently of the movement of the cage. This arrangement would serve to reduce the weight of the cage proper that has to be moved, thus, reducing the required power. Furthermore, for some installations, the cage may be eliminated in its entirety, the reversible variable speed units being used to actuate the gun per se and the parts carried thereby.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A driving mechanism for transmitting various movements to driven means, said driving mechanism including a pair of variable speed driving means, each of said driving means including a pair of coaxially mounted conical driving members, a second pair of coaxially mounted conical driven members, one of the conical members of each pair being adjustably mounted for axial adjustment, a driving ring for transmitting power from the conical driving members to the conical driven members, each of the adjustably mounted conical members terminating in a tubular sleeve portion, a pair of tubular bushings mounted for axial movement, said bushing of one of the conical members being located on one side of the driving ring and the bushing of the other conical member being located on the opposite side of the driving ring, and connecting means including a notched tubular member, said connecting means holding the bushings in fixed spaced relation from each other, so that as one bushing is adjusted and with it its conical member, the other bushing is adjusted and with it its conical member, said connecting member having its longitudinal axis positioned in a plane determined by the axes of rotation of the conical members and substantially coincidental with the axis of rotation of the driving ring so as to cause the bushings and their respective conical members to be adjusted in parallel paths.

2. A driving mechanism for transmitting various movements to driven means, said driving mechanism including a pair of variable speed driving means, each of said driving means including a pair of coaxially mounted conical driving members, a second pair of coaxially mounted conical driven members, one of the conical members of each pair being adjustably mounted for axial adjustment, a driving ring for transmitting power from the conical driving members to the conical driven members, a pair of tubular bushings mounted for axial movement, one of the tubular bushings being coaxially disposed with respect to the conical driving members one of which is journalled in said bushing for movement therewith, said one bushing being located for axial adjustment on one side of the ring, the other tubular bushing being coaxially disposed with respect to the conical driven members, one of which is journalled therein for axial movement therewith, said one bushing being located on the opposite side of the driving ring, said bushings being provided with notches opening so as to be directed in the general direction of the axis of rotation of the driving ring, and connecting means including a cylindrical connecting member for interconnecting the bushings, said cylindrical connecting member including cutaway portions on opposite sides of extensions projecting into said notches, so that as one bushing is adjusted the other bushing is adjusted in the same direction, to thereby adjust the two conical members journalled in the bushings in unison to change the relative speed of the driven members with respect to the driving members.

3. A driving mechanism for transmitting various movements to driven means, said driving mechanism including a pair of variable speed driving means, each of said driving means including a pair of coaxially mounted conical driving members, a second pair of coaxially mounted conical driven members, one of the conical members of each pair being adjustably mounted for axial adjustment, a driving ring for transmitting power from the conical driving members to the conical driven members, a pair of tubular bushings mounted for axial movement, one of the tubular bushings being coaxially disposed with respect to the conical driving members and located for axial adjustment on one side of the ring, the other tubular bushing being coaxially disposed with respect to the conical driven members and located on the opposite side of the driving ring, each of the adjustable conical members terminating in a tubular sleeve journalled in one of said bushings for axial adjustment therewith, said bushings being provided with notches opening so as to be directed in the general direction of the axis of rotation of the driving ring, and connecting means provided with extensions projecting into said notches, said connecting means including a pin and a sleeve mounted upon the pin, said pin having an extension projecting into one of the notches of one bushing and the sleeve having an extension projecting into the notch of the other bushing, said sleeve being fixedly mounted upon the pin so that as one bushing is adjusted axially the other bushing is adjusted in like manner.

4. A driving mechanism for transmitting various movements to driven means, said driving mechanism including a pair of variable speed driving means, each of said driving means including a pair of conical driving members, a second pair of conical driven members, one of the conical members of each pair being adjustably mounted for axial adjustment, a driving ring for transmitting power from the conical driving members to the conical driven members, a pair of tubular bushings mounted for axial movement, one of the tubular bushings being concentrically disposed with respect to the conical driving members and located for axial adjustment on one side of the ring, the other tubular bushing being coaxially disposed with respect to the conical driven members and located on the opposite side of the driving ring, each of the adjustable conical members terminating in a tubular sleeve journalled in one of said bushings for axial adjustment therewith, said bushings being provided with notches opening so as to be directed in the general direction of the axis of rotation of the driving ring, connecting means provided with extensions projecting into said notches, said connecting means including a pin and a sleeve mounted upon the pin, said pin having an extension projecting into one of the notches of one bushing and the sleeve having an extension projecting into the notch of the other bushing, said sleeve being fixedly mounted upon the pin so that as one bushing is adjusted axially the other bushing is adjusted in like manner, and means for axially adjusting the tubular sleeve upon the pin to thereby adjust the relative distance between the bushings.

5. A driving mechanism for transmitting various movements to driven means, said driving mechanism including a pair of variable speed driving means, each of said driving means including a pair of conical driving members, a second pair of conical driven members, one of the conical members of each pair being adjustably mounted for axial adjustment, a driving ring for transmitting power from the conical driving members to the conical driven members, a pair of tubular bushings mounted for axial movement, one of the tubular bushings being concentrically disposed with respect to the conical driving members and located for axial adjustment on one side of the driving ring, the other tubular bushing being coaxially disposed with respect to the conical driven members and located on the opposite side of the driving ring, each of the adjustable conical members terminating in a tubular sleeve journalled in one of said bushings for axial adjustment therewith, said bushings being provided with arcuate notches having a common center of curvature, cylindrical connecting means for interconnecting said bushings, said connecting means having arcuate cut-away portions on one side centered on the center of rotation of one pair of conical members and arcuate notches on the opposite side centered on the center of rotation of the other pair of conical members, the cut-away portions on the connecting means complementing the cut-away portions on the bushings, so that the bushings are interconnected through said connecting means so that as one bushing is adjusted axially the other bushing is adjusted in like manner.

6. A driving mechanism for transmitting various movements to driven means, said driving mechanism including a pair of variable speed driving means, each of said driving means including a pair of conical driving members, a second pair of conical driven members, one of the conical members of each pair being adjustably mounted for axial adjustment, a driving ring for transmitting power from the conical driving members to the conical driven members, a pair of tubular bushings mounted for axial movement, one of the tubular bushings being concentrically disposed with respect to the conical driving members and located for axial adjustment on one side of the driving ring, the other tubular bushing being coaxially disposed with respect to the conical driven members and located on the opposite side of the driving ring, each of the adjustable conical members terminating in a tubular sleeve journalled in one of said bushings for axial adjustment therewith, said bushings being provided with arcuate notches having a common center of curvature, cylindrical connecting means for interconnecting said bushings, said cylindrical connecting means including a pin having arcuate notches on one side having a common center on the axis of rotation of one set of conical members, an adjusting sleeve mounted on the pin, said sleeve having arcuate notches centered on the axis of rotation of the other pair of conical members, the portions between the notches on the pin being seated in the notches of the adjacent bushing, the portions between the notches on the tubular sleeve being seated in the notches of the other bushing, means for adjusting the tubular sleeve on the pin to thereby adjust the distance between the bushings, and means interconnected to one of the bushings for shifting the bushings axially in unison to change the relative speed of the conical members.

DAVID HANS HEYNAU.